Nov. 7, 1939.  R. M. BOWIE  2,178,827
ELECTRIC POWER CONTROL SYSTEM
Filed Sept. 1, 1937   2 Sheets-Sheet 1
```
-------- LINE VOLTAGE
———————— VOLTAGE ACROSS WELDER PRIMARY
—·—·—·— WELDER PRIMARY CURRENT
———————— TRIGGERING SIGNAL
```
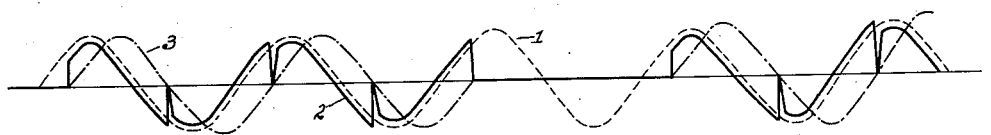
Fig. 1.
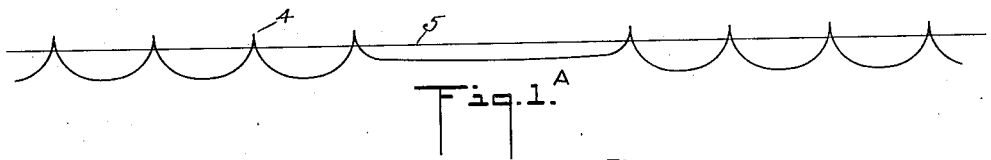
Fig. 1.ᴬ
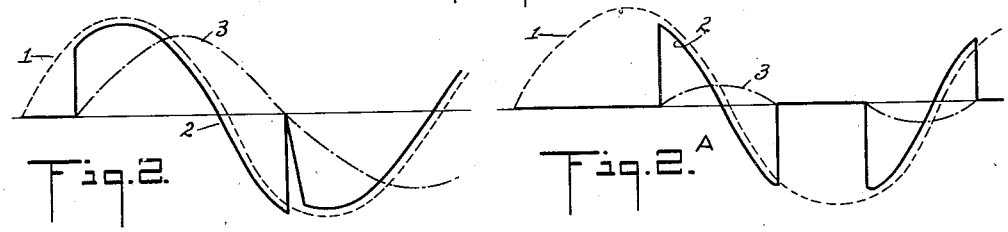
Fig. 2.    Fig. 2.ᴬ
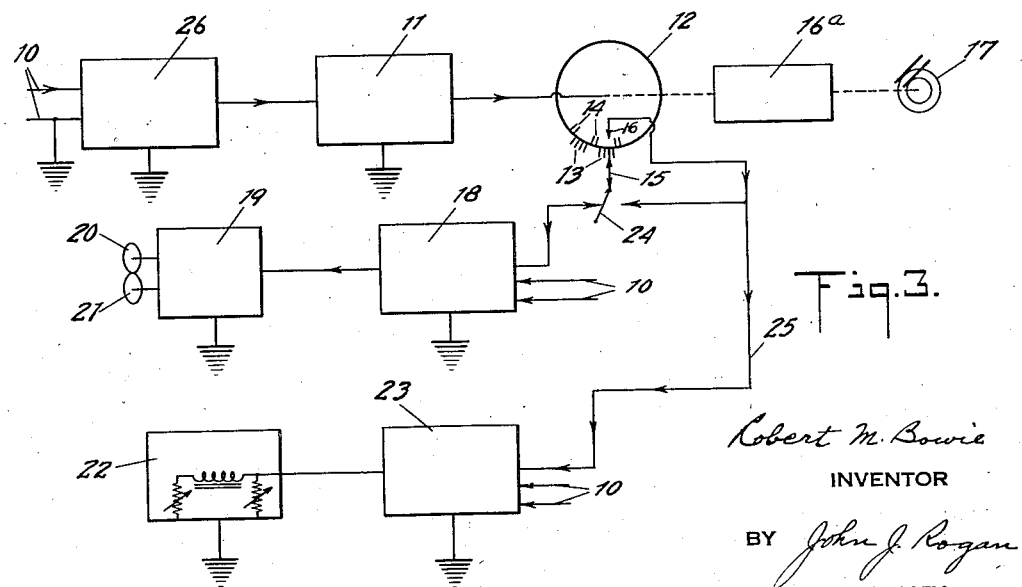
Fig. 3.
Robert M. Bowie
INVENTOR
BY John J. Rogan
ATTORNEY Nov. 7, 1939.   R. M. BOWIE   2,178,827
ELECTRIC POWER CONTROL SYSTEM
Filed Sept. 1, 1937   2 Sheets—Sheet 2

Robert M. Bowie
INVENTOR
BY John J. Logan
ATTORNEY

Patented Nov. 7, 1939

2,178,827

UNITED STATES PATENT OFFICE 2,178,827

ELECTRIC POWER CONTROL SYSTEM

Robert M. Bowie, St. Marys, Pa., assignor to Hygrade Sylvania Corporation, Salem, Mass., a corporation of Massachusetts Application September 1, 1937, Serial No. 161,923

18 Claims. (Cl. 171—97)

This invention relates to electric transmission systems and more particularly to methods and means for controlling the interaction between a load and an electric transmission line.

An object of the invention is to avoid unsteadiness in a supply line voltage when a load device is switched on to and off the line.

Another object is to present to a transmission line substantially the same impedance when a load device is absorbing useful power, as when it is not absorbing useful power from the line.

Another object is to provide an improved electrical power dissipating network for use in conjunction with an electrical power utilizing network.

Another object is to provide a system for intermittently operating a plurality of electrical devices from a common transmission line without substantial change in the impedance presented to the line during the on and off periods of use of one or more devices.

A feature of the invention relates to a novel power dissipating circuit to correct the unequal power consumption of power from the electric transmission line by certain electrical load devices.

Another feature relates to a power dissipating network in conjunction with a special switching arrangement whereby the said network is selectively and automatically associated with the power line during the off or idle periods of an intermittently energized load device.

Another feature relates to the method and apparatus for starting and stopping an electric power device, for example an electric seam welder, whereby the power line is subjected to a minimum of disturbance during the switching on and off of the welding circuit.

A further feature relates to an electric welding circuit which is arranged to be energized intermittently, having associated therewith a power dissipating network whereby the intermittent energization does not materially affect the line voltage retroactively.

A further feature relates to a noval form of switching arrangement for controlling the intermittent energization of a welding circuit.

A further feature relates to the method and apparatus for controlling the power consumption of a seam welder or the like.

A still further feature relates to the novel organization, arrangement and connection of parts which constitute an improved seam welder and control circuit therefor.

Other features and advantages not specifically enumerated will be apparent after a consideration of the following detailed descriptions and the appended claims.

While the invention will be illustrated as embodied in an electric welding system of the seam welding type, it will be understood that it is applicable to other types of welding and in certain of its aspects the invention is applicable to any electric transmission system where current is supplied from a line and the load device is energized or draws power intermittently. Accordingly in the drawings, Figs. 1, 1a, 2 and 2a, are wave diagrams explanatory of certain features of the invention.

Fig. 3 is a block schematic diagram of a welding control system employing features of the invention.

General description

Figure 4:
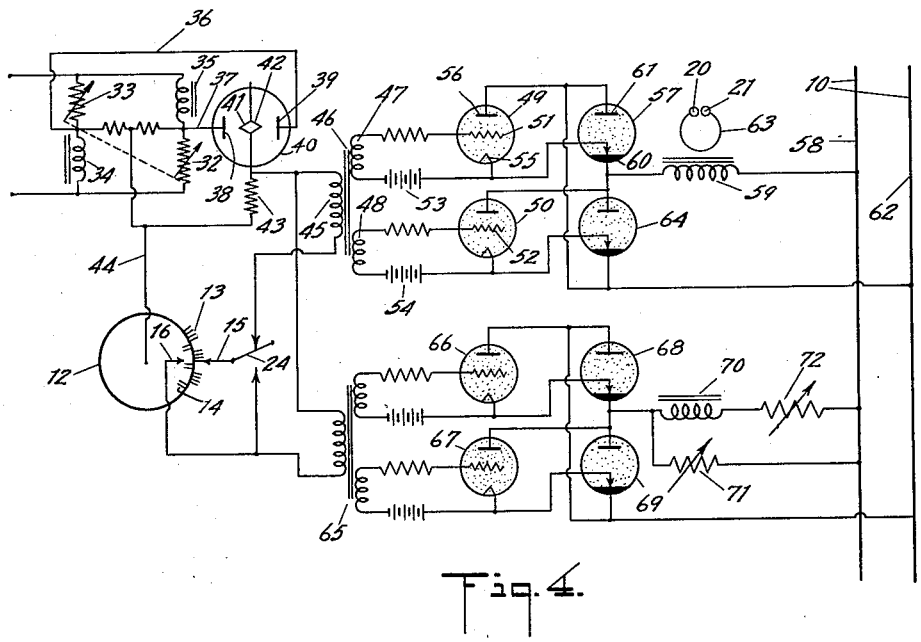
Fig. 4 is a detailed wiring diagram of the system of Fig. 3.

An electrical seam welder is a special type of spot welder wherein the welding electrodes include two opposed rotatable discs pressed tightly together and between which the body or work to be welded passes. The welding current instead of flowing continuously is interrupted for one or more cycles at regular intervals usually every few cycles. For example the control mechanism may be set to allow welding current to flow during four half cycles of an alternating current supply, and then to interrupt it for two half cycles, and so on. It is customary to speak of the period of time during which the welding current is flowing, as the duty period, while the period during which no current flows is referred to as the off period.

As seam welders may be of relatively high power consumption, for example 100 K. V. A., or higher, the current consumed from the power line during the duty periods is frequently sufficient to lower the voltage on the line by an appreciable amount, for example a few percent or more. If the consumption of power from the line were steady instead of intermittent during the time of welding a seam, the change in line voltage would probably not be noticed. Thus electric lights connected to the same power line as that which supplies the welder, would merely become slightly dimmer during the time of welding and then become brighter when the weld is completed. As a seam frequently requires 15 to 30 seconds to weld, only occasional flickers would be noticed. Unfortunately however, the consumption of power during the duty period and not during the off period causes the line voltage to fluctuate at a frequency which causes an annoying disturbance on the line, and where such devices as incandescent lamps are connected to the line, an annoying flicker is produced. The effect is somewhat the same, as, although frequently more noticeable than, that observed when lamps are lighted from a 25 cycle power main.

Various attempts have been made to eliminate this undesirable flicker of the power line voltage. For instance, the welder can be operated from an A. C. generator coupled to an induction motor. In this case, the inertia of the moving parts of the motor generator is sufficient to absorb the slight flicker. However such an arrangement is expensive to install and requires careful maintenance. It has also been suggested to place a condenser across the line adjacent the welder. If the condenser is of such a capacity to correct the lagging power factor of the welder during the duty period, it will produce a leading power factor during the off period. When placed directly across the primary of the transformer, such a condenser frequently sets up spurious oscillations during the off periods. Even neglecting this possible objection, the condenser can at best merely correct the power factor of the transformer, thereby making the welding load appear to the line to be a pure resistance. Although the line drop may be somewhat reduced, it is not eliminated by the foregoing means.

In order to understand the particular conditions attendant upon the operation of an electric seam welder a description will be given of the conventional method of operating such a welder. The welder proper consists fundamentally of a step down transformer the secondary of which is but a single turn nearly short circuited by the material being welded. Practically all the power is delivered to the material between the welding wheels. Special switching means must be provided to turn on the welding current every half cycle of the duty period and to shut itself off automatically when the alternating current passes through zero. In accordance with the present invention the switching is effected by means of gas or vapor-filled tubes and a special commutating mechanism. In order to understand the manner of operation of the switching means it is necessary to the consider the relation between the line or supply voltage, the voltage across the primary of the welding transformer, the welder primary current, and the special triggering signal. Thus there are shown in Fig. 1 the time relations between the various currents and voltages, the several curves being identified in accordance with the key adjacent the diagram. The numeral 1 indicates the line voltage, 2 indicates the voltage across the primary of the welder transformer, and 3 is the current consumed in the welder electrodes. Fig. 1a represents the corresponding time relation of the triggering voltage, the triggering voltage wave being of such a shape that only when the voltage is greater than the threshold value 5 is the welding circuit completed. It should be noted that at the beginning of a duty period and as the voltage 1 rises from zero, the voltage across the transformer remains at zero until the switch is closed when the triggering voltage is above its threshold value at the points 4. The primary voltage 2 then rises steeply to correspond with that of the line. As the current passes through zero, the gas tube switch automatically opens as, due to the inductance of the transformer the current lags behind the voltage as indicated. It is this lagging current which keeps the switch closed when the voltage goes negative.

In order to vary the power consumed by the welder means are provided to change the point on the line voltage curve 1 at which the gas tube switch is closed. Fig. 2 shows in more detail the first cycle of the duty period. In this case, the switch is closed 45 electrical degrees after the voltage 1 starts to rise, and the current consumed is denoted by the curve 3. The power consumed is, of course, the integral over the cycle of the products of the instantaneous values of the transformer voltage and current shown in curves 2 and 3. In Fig. 2a, the first cycle of the duty period is shown, wherein the power consumed is considerably less than that in Fig. 2. Although the line voltage 1 remains unchanged, the switch is closed 135 electrical degrees after the voltage 1 starts to rise. The current curve 3 rises to a much smaller extent than in Fig. 2, and therefore, the integral of the instantaneous products of curves 2 and 3 in Fig. 2a is considerably less than in the case of Fig. 2.

*Detailed description*

Referring to Fig. 3 a description will now be given of the general plan of the welder control and dissipating arrangements according to the invention. In this figure the numeral 10 represents a suitable transmission or power supply line supplying alternating current for example the usual 60 cycle supply. The line current is passed through a phase changing network whereby the switch circuit may be closed at the desired point during the line voltage cycle to control the power consumption as described in connection with Figs. 2 and 2a. It is by adjusting this network that the current-voltage conditions of either Fig. 2 or Fig. 2a are obtained. The 60 cycle voltage of the proper adjusted phase is then passed through a peaking and doubling network 11 whereby the substantially sinusoidal 60 cycle supply is changed into a 120 cycle wave with sharply peaked tops of the general character shown in Fig. 1a, to act as the triggering voltage. At this stage the peaks are uniformly spaced or uninterrupted. By means of special commutator means, these 120 cycle impulses are segregated into groups to control the duty periods and off periods. While any well known form of commutating mechanism may be employed, a typical arrangement may comprise a rotor 12 carrying contact sets or pins 13 for the duty periods and contact sets or pins 14 for the off periods. A fixed brush 15 is arranged to engage the contact sets 13 and another fixed brush 16 is arranged to engage the contact sets 14. While the drawings show only a few contact sets, it will be understood that the sets are distributed around the rotor alternately in sets of two and four as shown, and that each contact is electrically connected through a common slip ring and brush to the lead from the peaking circuit 11. The rotor is preferably driven through reduction gears 16a from a synchronous motor 17 which is driven from the supply mains 10. In the particular arrangement to be described the duty periods consist of four half cycles as controlled by the contacts 13. Thus the peaked waves are chopped up into groups of four impulses with each group separated from the succeeding group by spaces equivalent to two half cycles. The 120 cycle triggering signal is then applied to a switching arrangement 18 of any well known construction, but preferably this arrangement comprises a combination of gas or vapor filled tubes of the "Ignitron" and "Thyratron" types. The switching arrangement is designed to allow current to flow from the power line 10 to the seam welder 19 for four half cycles; then shuts it off for two half cycles and so on. Preferably the voltages for operating the "Ignitrons" and "Thyratrons" are derived from the line 10. The welding electrodes are represented schematically by the numerals 20, 21.

During the off periods of the welder, the pins 14 projecting radially inward of the commutator make contact with brush 16 which leads to the power dissipation network 22. In this case the trigger signal of 120 cycles consists of two pulses separated by four half cycles, as indicated. Thus power flows to the dissipating circuit only during the off periods of the seam welder. Interposed between the brush 16 and the dissipation circuit is a switching arrangement 23 which is preferably similar to the switching arrangement 18 and comprises a combination of "Ignitron" and "Thyratrons". It will be understood that the electrical characteristics of the dissipation circuit 22 have been previously adjusted so as to present exactly the same impedance to the line 10 as does the welder. In this way, the line furnishes power continuously, thus eliminating the disagreeable flicker in the line voltage.

When the seam welder is in use the switch arm 24 is closed on its left contact as shown. When the weld has been completed and the operator wishes to remove the work, switch 14 is snapped quickly to the righthand position causing the dissipation circuit to take power at every cycle since both brushes 15 and 16 are connected to line 25. Thus even when the seam welder is off, the system as a whole, presents a constant impedance to the line 10. When it is desired to start a new weld, it is merely necessary to snap the switch quickly from the righthand position back to the left. When starting the welder up in the morning and closing it down at night it is, of course, necessary to shut off the power which is being consumed by the combined seam welder and dissipating circuit. To do so suddenly, as by pulling the line circuit breaker, would introduce a sudden raising of the line voltage which might be undesirable. Even this can be avoided by throwing the switch 24 to the righthand position and then gradually decreasing the power consumed by operating the manually adjustable phase shifting network 26. When the power consumed has reached substantially zero, the line circuit breaker can be opened without noticeable effect on the line voltage. The reverse procedure can be used in the morning when starting the welder.

Referring to Fig. 4 a description will now be given of a detailed circuit arrangement corresponding to the schematic arrangement of Fig. 3. It will be understood that the circuit of Fig. 4 is merely illustrative of one preferred manner of carrying out the invention, and that other modifications and changes may be made therein as will be obvious to those familiar with the arts of welding control and discharge tubes. In this embodiment the manually adjustable phase change network comprises inductances 34 and 35, the center-tapped resistor 33 and the variable rheostats 31 and 32. Preferably the rheostats 31 and 32 are provided with a single control whereby they may be simultaneously varied. The 60 cycle supply line 10 is connected across this network in the manner indicated and the phase adjustment is effected by varying the rheostats 31 and 32, the phase-adjusted voltages being led off through the conductors 36, 37. It will be understood of course that any other wellknown type of phase-changer may be employed. The phase-adjusted voltages are then impressed on the anodes 38, 39 of a suitable full-wave rectifier 40 preferably, although not necessarily, of the hot cathode type, the full-wave cathodes of which are designated respectively by the numerals 41, 42. The center points of the cathodes are returned through the load resistor 43, which is preferably non-capacitive, to the midpoint of resistor 33. There are thus produced across the load resistor 43 voltage variations of 120 cycle frequency and the waves have sharply peaked tops of the character shown in Fig. 1a. It will be understood that any other wellknown frequency doubling and wave peaking arrangement may be employed in place of that shown.

The 120 cycle peaks which would otherwise be continuous are broken up into successive spaced groups of 120 cycle impulses by any wellknown form of commutating means. Merely for purposes of explanation there is shown a mechanically rotating commutator comprising a rotor 12 which is electrically connected to the conductor 44 and thence to one side of the load resistor 43. Rotor 12 has mounted therein around its periphery and extending outwardly therefrom successive spaced groups of conducting pins 13. Rotor 12 also has mounted around its periphery but extending radially inwardly therefrom other spaced groups of conducting pins 14, each pin being equally spaced from the adjacent pins. The pins 13 correspond to the duty periods of the welder and the rotor is rotated at such a speed by a synchronous motor and reduction gear that 120 pins make contact with one of the brushes 15 or 16 per second. Brush 15 which contacts with the pins 13 is connected to the switch arm 24 which when the welder is in operation connects with the lower end of the primary winding 45 of transformer 46. The upper end of winding 45 is returned to the cathodes of the full-wave rectifier 40.

Transformer 46 is provided with a pair of secondary windings 47, 48 by means of which the direction of the impulses are inverted and applied to the grids of the "Thyratrons" 49, 50. It will be understood that the grids 51 and 52 of the "Thyratrons" are properly biased as for example by the biasing batteries 53, 54 so as to allow current to flow between the associated cathode 55 and plate 56 of each "Thyratron" only when the applied impulse to the grid is above a certain predetermined threshold value. The plates of the "Thyratrons" are preferably energized from the same supply line 10, consequently if during a given half cycle, the plate of tube 49 for example is positive, and a sufficiently positive impulse is applied to grid 51, the tube 49 becomes conductive for the remainder of the cycle of the power line voltage as is wellknown in the operation of "Thyratrons". When tube 49 is conductive between cathode and plate, it immediately triggers off the "Ignitron" tube 57 whereby welding current flows from the line wire 58, through the primary 59 of the welding transformer thence across the mercury cathode 60 and anode 61 of "Ignitron" 57 back to the line wire 62. The secondary winding 63 of the welding transformer is thus energized in successive groups of alternating current impulses as determined by the pins 13. Although the grid 52 receives the same positive impulse as that applied to grid 51, tube 50 is not rendered conductive because at that instant the plate of tube 52 is negative with respect to its cathode. During the next half cycle of the line voltage the "Thyratron" 50 and the associated "Ignitron" 64 become operative if an impulse is applied to grid 52. Thus, transformer 46, tubes 49, 50 and tubes 57 and 64 constitute an inertialess switch illustrated schematically in Fig. 3 by the numeral 18.

The switching mechanism for the dissipation circuit is similar to that already described and comprises an inverting transformer 65; a pair of "Thyratrons" 66, 67; a pair of "Ignitrons" 68, 69. However the tubes are controlled by those impulses which do not activate the welder switching tubes, that is to say they are controlled by the pins 14. The dissipating circuit may be of any suitable type and is preferably designed so as to present to the line 10 substantially the same impedance as the welder secondary load circuit. For example this dissipating circuit may comprise an inductance 70, and a pair of variable resistors 71, 72 by means of which the impedance of the welder local circuit may be matched.

Figure 5:
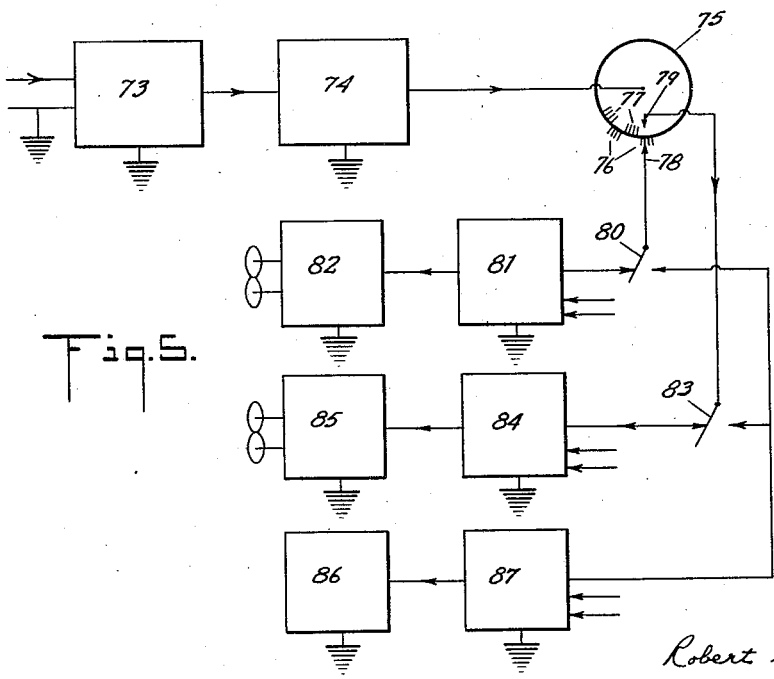
Fig. 5 is a schematic block diagram showing the invention embodied in a system for operating a plurality of welders in conjunction with a common power dissipation circuit.

In the event that two or more seam welders are to be operated it is possible to connect them in multiple with a saving of current. The feasibility of such an arrangement depends on the ratio of the number of half cycles in the duty period to the number in the off period. Where the duty period is equal to or shorter than the off period, suitable multiple connections are reasonably easy to make. Thus there is shown in Fig. 5 an arrangement wherein two seam welders having equal duty and off periods are operated from the same controls and with a common dissipation control arrangement. While Fig. 5 shows the various circuit elements and connections in schematic form it will be understood that the corresponding parts may be identical with those of Fig. 4. Thus the phase shifter 73 may include the elements 32, 33, 34 and 35 the output of which is peaked and doubled in frequency by a device 74 such as tube 40. The peaked waves are then chopped into the duty and off periods by a commutator 75 similar to commutator 12. However the commutator 75 is provided with equally spaced groups of pins 76 and other equally spaced groups of pins 77 there being the same number of equally spaced pins in each group. The brush 78 leads through switch 79 in its lefthand position to a switching circuit 80 comprising a combination of "Thyratrons" and "Ignitrons" such as 49-50, 57, 64 (Fig. 4). The switching arrangement controls the duty and off periods of current flow to the first welder 81. The brush 79 leads through switch 83 in its lefthand position to a similar switching arrangement 84 to the second welder 85. Thus when the switches 80 and 83 are in the position shown, welders 82 and 85 take power while the dissipating circuit 86 does not. If either of the switches 80, 83 is moved to its righthand position, the dissipating circuit merely takes the place of one welder in consuming power from the line. If both switches are moved to their righthand positions neither welder is energized and the dissipating circuit 86 consumes power from the line during every half cycle, under control of a switching arrangement 87 similar to those already described.

While certain particular embodiments, apparatus and connections of parts have been disclosed it will be understood that various changes and modifications may be made therein without departing from the spirit and scope of the invention.

What I claim is:

1. In combination, an A. C. transmission line, an electric device to be operated by power from said line, means to supply power to said device at recurrently spaced intervals, and means to dissipate from said line during the interruption of the power supply to said device substantially the same amount of power as is supplied to said device and switching means for switching said dissipating means into circuit only when the load current is substantially zero.

2. In combination, an electric transmission line; an electric load device having recurrent on and off periods; means to energize said device from said line at recurrently spaced intervals; means to control the duration of said intervals, the last mentioned means including means to derive recurrent spaced triggering impulses from said line, and switching means effective to pass current to said load device under control of said triggering impulses; and means to substitute automatically at the beginning of each of said off periods a network for dissipating the same amount of power as that of said device.

3. In combination, an A. C. power supply line, an electric load device for utilizing power from said line, a network for dissipating power from said line and means automatically to energize said device and said network alternately whereby the A. C. impedance facing said line is kept substantially constant and switching means for switching said network into circuit only when the load current is substantially zero.

4. In combination, an A. C. power supply line, an electric load device for utilizing power from said line, a dissipating network for dissipating power from said line to the same extent as said load device, switch means between the line and the load device, switch means between the line and dissipating network, means to derive triggering impulses from the line, and means to apply said triggering impulses groups alternately to the first mentioned switch means and the second mentioned switch means so that the substitution of said network for said device occurs only when the load current is substantially zero.

5. In combination, an alternating current supply line, an electric load device to be energized by power from said line, a dissipating network to be energized by power from said line, at least one gaseous discharge tube of the grid-controlled type, at least one discharge tube of the gaseous arc type, said tubes being connected to control the application of current to said load device at spaced intervals, at least one other gaseous discharge tube of the grid-controlled type, and at least one other discharge tube of the arc-discharge type connected to control the energization of said network at recurrently spaced intervals, means to derive spaced triggering impulses from said line, and means to apply said triggering impulses groups alternately to the grids of said grid-controlled tubes when the load current is passing through zero.

6. In combination, an electric load device to be energized from an alternating current supply line, an inertialess switch arrangement between said device and said line to energize said device at spaced intervals, a power dissipation network, another inertialess switch arrangement between said network and the line, means to derive spaced groups of triggering impulses, and means to apply alternate groups of said triggering impulses respectively to the first switch arrangement and to the second switch arrangement whereby the same power load conditions exist on said line regardless of whether said load device is being energized, said dissipation network being switched into circuit only when the load current is substantially zero.

7. In combination, an alternating current supply line, an electric load device to be energized by power from said line, an arc-discharge tube of the "Ignitron" type connected in series between said load device and the line, a grid-controlled tube of the "Thyratron" type for controlling the conductivity of the first mentioned tube, the plate voltage for the grid-controlled tube being derived from said line, circuit connections between the two tubes whereby the first tube becomes conductive only when a triggering impulse above a predetermined threshold value is applied to the grid of the second tube, means to derive peaked triggering impulses from said line having a predetermined frequency ratio with respect to the line frequency, means for applying said peaked triggering impulses to the grid of said grid-controlled tubes, an additional grid-controlled tube of the "Thyratron" type and an additional tube of the "Ignitron" type to provide full wave energization of the load device under control of said triggering impulses, and an artificial load to be substituted for the said load device when said load device is not drawing current, said artificial load being switched into circuit when the load current of said device is substantially zero and under control of said triggering impulses.

8. In combination, an alternating current supply line, an electric load device to be energized by power from said line, an arc-discharge tube of the "Ignitron" type connected in series between said load device and the line, a grid-controlled tube of the "Thyratron" type for controlling the conductivity of the first mentioned tube, the plate voltage for the grid-controlled tube being derived from said line, circuit connections between the two tubes whereby the first tube becomes conductive only when a triggering impulse above a predetermined threshold value is applied to the grid of the second tube, means to derive peaked triggering impulses from said line having a predetermined frequency ratio with respect to the line frequency, means for applying said peaked triggering impulses to the grid of said grid-controlled tubes, a dissipation network having substantially the same A. C. impedance as that of said load device, and an additional grid-controlled tube and an additional arc-discharge tube for controlling the energization of said dissipation network only during the periods when the load device is not consuming power, whereby said network is switched into circuit only when the load current of said load device is substantially zero and under control of said triggering impulses.

9. A power control arrangement comprising an alternating current load device to be energized from an alternating current supply line, a power dissipation network to absorb power from said line, a switch arrangement automatically controlled by said supply line for controlling the application of power to said load device, another switch arrangement also automatically controlled by said supply line for controlling the application of power to said network, control means including a switch effective in one position to render said switch arrangements alternately effective in applying power to the load device and the dissipation network and effective in another position to render only said other switch arrangement effective in applying power continually to said network.

10. In combination, an A. C. load device, a power dissipation network associated with said device, said network presenting to the power line substantially the same A. C. impedance as the device, and means automatically to render said network effective to absorb power from the line during the periods when the device is not absorbing power from the line, the last-mentioned means including an automatic switch which connects said network to said line when said device is not absorbing power from the line, the switching in being effective only when the load current is substantially zero.

11. In combination, an A. C. operated device of the type which operates at regularly recurrent "duty" periods and "off" periods, and means for presenting to the A. C. supply line substantially the same A. C. impedance during the "duty" and "off" periods of the device, the last-mentioned means including an artificial power dissipating network and switching means for switching said network into circuit only when the load current drawn by said device is substantially zero.

12. In combination, an A. C. load device of the type having recurrent "duty" and "off" periods, a power dissipation network associated with the device and switching means between the device and the supply line and between the network and the supply line arranged to present a substantially constant A. C. impedance to the line both during the "duty" and "off" periods of the device, said switching means being effective to switch in the dissipating network only when the load current is substantially zero.

13. In combination, an A. C. load device of the type having recurrent "duty" and "off" periods, a dissipating network to consume power during the "off" periods of the device, and switching means to connect said device to the line during the "duty" periods and to connect automatically the dissipating network to the line during the "off" periods, said switching means being effective to switch in said dissipating network only when the load current is substantially zero.

14. An electric load device of the A. C. type having regularly recurrent "duty" and "off" periods a control circuit for said device including a dissipation network to consume power only during the "off" period of the device and means to control the effective impedance presented to the line by the device and the device control circuit jointly, the last-mentioned means including inertialess switch means for automatically substituting said dissipating network for the load device as the load current is passing through zero.

15. In combination a plurality of load devices of the A. C. type having "duty" periods and "off" periods at least one power dissipating network common to said devices, and switching arrangements for controlling the presentation to said line of substantially constant A. C. impedance during the "duty" and "off" periods of said devices and network, the last-mentioned means being effective to switch in said dissipating network only when the load current is substantially zero.

16. In combination, a plurality of load devices of the intermittently energized A. C. type, means to supply the devices with current at regularly recurrent intervals, and a power dissipation network and switching arrangement for presenting substantially constant A. C. impedance to the supply line whether one or more devices are in operation and presenting substantially constant A. C. impedance to the line during the "duty" and "off" periods of the devices, the last-mentioned means being effective to switch in said dissipating network only when the load current is substantially zero.

17. In combination, a plurality of load devices, at least one dissipating network, switching means to control the flow of power from an A. C. line associated with each load device and said networks, means to derive triggering impulses from said line, and means for applying said impulses in groups to said switching means so that the substitution of one load device for another or the substitution of said network for one or more of said load devices, takes place when the currents through said switching means are substantially zero.

18. A power control arrangement as described in claim 9 having means for gradually varying the power consumed by said dissipating network between zero and a predetermined desired level when said switch is in the second-mentioned position.

ROBERT M. BOWIE.